(12) United States Patent
Strohmaier et al.

(10) Patent No.: US 7,651,677 B1
(45) Date of Patent: Jan. 26, 2010

(54) METHOD OF PREPARING SSZ-74

(75) Inventors: Karl G. Strohmaier, Port Murray, NJ (US); Simon C. Weston, Annandale, NJ (US)

(73) Assignee: ExxonMobil Research and Engineering Co., Annandale, NJ (US)

( * ) Notice: Subject to any disclaimer, the term of this patent is extended or adjusted under 35 U.S.C. 154(b) by 0 days.

(21) Appl. No.: 12/283,592

(22) Filed: Sep. 12, 2008

(51) Int. Cl.
*C01B 39/04* (2006.01)
(52) U.S. Cl. ...................................................... 423/706
(58) Field of Classification Search .................. 423/706
See application file for complete search history.

(56) References Cited

U.S. PATENT DOCUMENTS

| | | | |
|---|---|---|---|
| 7,348,295 B2 | 3/2008 | Zones et al. | |
| 7,357,904 B2 | 4/2008 | Zones et al. | |
| 7,422,732 B2 | 9/2008 | Zones et al. | |
| 7,432,402 B2 | 10/2008 | Zones et al. | |
| 7,473,807 B2 | 1/2009 | Zones et al. | |
| 7,485,766 B2 | 2/2009 | Burton, Jr. et al. | |
| 2007/0144939 A1 | 6/2007 | Zones et al. | |
| 2007/0148067 A1 | 6/2007 | Zones et al. | |
| 2007/0148086 A1 | 6/2007 | Zones et al. | |
| 2007/0149778 A1 | 6/2007 | Zones et al. | |

FOREIGN PATENT DOCUMENTS

WO    WO 2007/079038 A2    7/2007

OTHER PUBLICATIONS

Baerlochner et al, "Ordered silicon vacancies in the framework structure of the zeolite catalyst SSZ-74", Nature Materials, vol. 7, Aug. 2008, published online (Jul. 11, 2008).*

* cited by examiner

*Primary Examiner*—David M Brunsman
(74) *Attorney, Agent, or Firm*—Liza Montalvo

(57) ABSTRACT

The present invention is directed to a method of preparing a synthetic crystalline material having an SSZ-74 crystal structure in the absence of a source of fluoride ions.

10 Claims, 1 Drawing Sheet

METHOD OF PREPARING SSZ-74

FIELD OF THE INVENTION

The present invention relates to a method of preparing a synthetic crystalline material. Specifically, the present invention relates to a method of preparing a synthetic crystalline material having the structure type of SSZ-74.

BACKGROUND OF THE INVENTION

Because of their unique sieving characteristics as well as their catalytic properties, crystalline molecular sieves and zeolites are especially useful in applications such as hydrocarbon conversion, gas drying and separation.

Recently, Zones et al. reported the preparation of multidimensional 10-ring channel system SSZ-74, and its use in various hydrocarbon conversion and separation processes (see WO 2007/079038; U.S. Pat. No. 7,422,732; U.S. Pat. No. 7,357,904; U.S. Pat. No. 7,348,295; US 2007/0144939; US 2007/0148067; US 2007/0148086; US 2007/0149778; US 2007/0149789; US 2007/0149824; US 2007/0149837; and, Baerlocher et al. "Ordered silicon vacancies in the framework structure of the zeolite catalyst SSZ-74", Nature Materials, 2008 August; 7(8):631-5). SSZ-74 is a 3-dimensional medium pore zeolite with a silicon vacancy. Up to now, the method of preparing SSZ-74 has comprised contacting under crystallization conditions (1) a source of silicon oxide, (2) a source of aluminum oxide, indium oxide and mixtures thereof, (3) fluoride ions and (4) a structure directing agent comprising a 1,1'-(hexane-1,6-diyl)bis(1-methylpyrrolidinium) dication having the following structure 1,1'-(hexane-1,6-diyl)bis(1-methylpyrrolidinium)

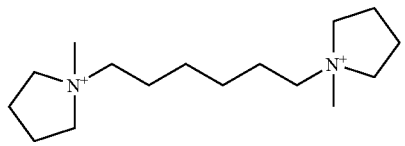

Although effective in producing the SSZ-74 crystal structure, the method requires the use of a source of fluoride ions posing potential safety and health concerns during manufacture. The use of fluoride in zeolite reaction gels is undesirable on a large scale because of the potential hazards involved. Anhydrous or aqueous hydrogen fluoride can cause painful and severe burns and even death.

There thus remains a need for a method of synthesizing a synthetic crystalline material that eliminates the need for a source of fluoride yet maintains a high purity yield of the material.

The present invention provides such a method. Specifically, the present invention provides a method of preparing a synthetic crystalline material having an SSZ-74 crystal structure in the absence of a source of fluoride ions.

SUMMARY OF THE INVENTION

The present invention is directed to a method of preparing a synthetic crystalline material; specifically, a method of preparing a synthetic crystalline material having the structure type of SSZ-74. The method comprises contacting under crystallization conditions a reaction mixture comprising at least one source of a trivalent element X, a source of silica and a 1,1'-(hexane-1,6-diyl)bis(1-methylpyrrolidinium) dication as structure directing agent (SDA), wherein the reaction mixture contains no source of fluoride ions. Optionally, the reaction mixture comprises an alkali metal cation.

Other aspects and advantages of the present invention will become apparent from the detailed description that follows.

DETAILED DESCRIPTION OF THE INVENTION

Figure 1:
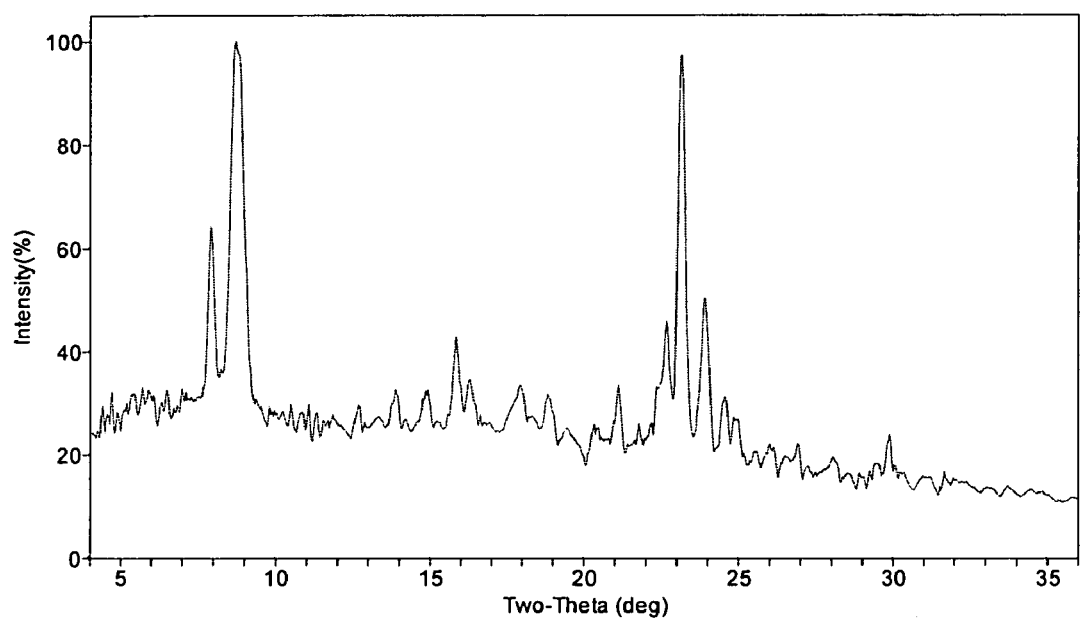
FIG. 1 shows the X-ray diffraction pattern of pure SSZ-74 zeolite.

It has now been found that synthesis of synthetic crystalline material having an SSZ-74 crystal structure can be achieved without the need for a source of fluoride ions eliminating the health and safety effects of using hydrogen fluoride.

In general, SSZ-74 is prepared by contacting a reaction mixture comprising at least one source of silica and at least one source of a trivalent element X, where X is aluminum, gallium, iron, titanium, indium, boron or mixtures thereof, with a 1,1'-(hexane-1,6-diyl)bis(1-methylpyrrolidinium) dication SDA in the absence of fluoride ion. Optionally, the reaction mixture further comprises an alkali metal cation.

The reaction mixture has the following composition, expressed in terms of molar ratios:

| Reactants | Useful | Preferred | Most Preferred |
|---|---|---|---|
| Si/X | 10-500 | 20-200 | 40-160 |
| $H_2O$/Si | 10-50 | 20-40 | 25-35 |
| $OH^-$/Si | 0.10-1.0 | 0.30-0.600 | 0.40-0.500 |
| Y/Si | 0-1.0 | 0-0.300 | 0.10-0.30 |
| SDA/Si | 0.05-0.5 | 0.15-0.225 | 0.18-0.200 | where X is aluminum, gallium, iron, titanium, indium, boron and mixtures thereof, Y is an alkali metal cation, and SDA is a 1,1'-(hexane-1,6-diyl)bis(1-methylpyrrolidinium) dication.

The source of silica may be any silica source suitable for use in zeolite synthesis, non-limiting examples of which include silicates such as alkali metal silicate, a tetraalkyl orthosilicate, or, a high surface area silica, for example one sold by Degussa under the trade names Aerosil or Ultrasil, or preferably, an aqueous colloidal suspension of silica, for example one sold by E.I. du Pont de Nemours under the trade name Ludox. Preferably, the silica source is inorganic and conveniently is an aqueous colloidal suspension of silica.

The trivalent element X may be any source of element X suitable for use in zeolite synthesis. Preferably, trivalent element X is aluminum, boron or mixtures thereof, most preferably aluminum. The source of aluminium is conveniently aluminium nitrate or hydrated alumina. Other aluminium sources include, for example, other water-soluble aluminium salts, sodium aluminate, or an alkoxide, e.g., aluminium isopropoxide, or aluminium metal, e.g., in the form of chips. A non-limiting example of a convenient source of boron is boric acid, preferably used as an aqueous solution.

If used, the source of alkali metal is advantageously potassium or sodium, sources of which include sodium bromide, potassium bromide, sodium chloride, potassium chloride, sodium nitrate, potassium nitrate, sodium iodide, potassium iodide, sodium hydroxide or sodium aluminate, or any other water soluble sodium and potassium salts that are not detrimental to the formation of SSZ-74.

The direct product of the synthesis described above has a characteristic XRD pattern, the essential reflections of which are substantially as set forth in Table 1.

TABLE 1

| 2 Theta | As synthesized SSZ-74 d-spacing (Angstroms) | Intensity |
|---|---|---|
| 7.94 | 11.130 | 27 |
| 8.64 | 10.220 | 32 |
| 8.84 | 9.990 | 61 |
| 9.01 | 9.810 | 19 |
| 13.93 | 6.350 | 6 |
| 14.84 | 5.960 | 7 |
| 15.91 | 5.560 | 12 |
| 16.34 | 5.420 | 6 |
| 17.74 | 4.995 | 5 |
| 18.06 | 4.907 | 9 |
| 18.27 | 4.852 | 2 |
| 18.93 | 4.684 | 10 |
| 20.33 | 4.364 | 12 |
| 20.66 | 4.296 | 5 |
| 21.03 | 4.221 | 9 |
| 21.84 | 4.066 | 5 |
| 22.69 | 3.915 | 29 |
| 23.09 | 3.850 | 100 |
| 23.22 | 3.828 | 95 |
| 23.92 | 3.717 | 76 |
| 24.55 | 3.624 | 24 |
| 24.92 | 3.570 | 15 |
| 25.63 | 3.473 | 2 |
| 26.10 | 3.412 | 7 |
| 26.73 | 3.333 | 6 |
| 26.95 | 3.306 | 8 |
| 28.10 | 3.174 | 6 |
| 29.55 | 3.021 | 4 |
| 29.90 | 2.986 | 17 |
| 30.31 | 2.946 | 4 |
| 31.12 | 2.872 | 3 |
| 33.42 | 2.679 | 1 |
| 33.92 | 2.641 | 1 |
| 35.95 | 2.496 | 3 |
| 37.62 | 2.389 | 1 |
| 38.47 | 2.338 | 2 |

The as synthesized material may be calcined, cation-exchanged, and otherwise treated as is known in the art. Alkali metal cations in the as-prepared or calcined form may be removed, for example by treatment with concentrated acids, e.g., HCl, or with a fugitive base, e.g., an ammonium compound, to provide the material in its hydrogen form.

After calcination, the product has a characteristic XRD pattern, the essential reflections of which are substantially as set forth in Table 2.

TABLE 2

| 2 Theta | As synthesized SSZ-74 d-spacing (Angstroms) | Intensity |
|---|---|---|
| 8.04 | 10.990 | 69 |
| 8.77 | 10.080 | 69 |
| 8.98 | 9.840 | 83 |
| 13.31 | 6.650 | 5 |
| 14.07 | 6.290 | 9 |
| 15.03 | 5.890 | 21 |
| 16.11 | 5.500 | 12 |
| 16.58 | 5.340 | 5 |
| 17.94 | 4.941 | 6 |
| 18.33 | 4.835 | 2 |
| 19.08 | 4.648 | 1 |
| 20.98 | 4.231 | 3 |
| 22.96 | 3.870 | 9 |
| 23.43 | 3.794 | 100 |
| 24.14 | 3.684 | 39 |
| 24.86 | 3.579 | 9 |
| 25.14 | 3.539 | 8 |
| 25.92 | 3.435 | 4 |
| 27.06 | 3.292 | 11 |
| 28.43 | 3.137 | 3 |
| 29.85 | 2.991 | 1 |
| 30.01 | 2.975 | 1 |
| 30.24 | 2.953 | 4 |
| 32.59 | 2.746 | 1 |
| 36.24 | 2.477 | 3 |

The products of the invention, if required after cation exchange and/or calcining, have utility as catalyst precursors, catalysts, and separation and absorption media. They are especially useful in numerous organic, e.g., hydrocarbon, compound conversions, separations and absorptions. They may be used alone, or in admixture with other molecular sieves, in particulate form, supported or unsupported, or in the form of a supported layer. Examples of such uses are disclosed in WO 2007/079038; U.S. Pat. No. 7,422,732; U.S. Pat. No. 7,357,904; U.S. Pat. No. 7,348,295; US 2007/0144939; US 2007/0148067; US 2007/0148086; US 2007/0149778; US 2007/0149789; US 2007/0149824; and, US 2007/0149837, which are herein incorporated by reference.

In practice, the synthetic crystalline material having an SSZ-74 crystal structure is prepared by combining in a liquid medium, preferably water, at least one source of silica, at least one source of a trivalent element X, where X is aluminum, gallium, iron, boron, titanium, indium and mixtures thereof, and a 1,1'-(hexane-1,6-diyl)bis(1-methylpyrrolidinium) dication having an anionic counterion which is not detrimental to the formation of SSZ-74. Optionally, the reaction mixture comprises an alkali metal cation. The reaction mixture contains no source of fluoride ions.

The aqueous solution is maintained under conditions sufficient to form crystals of SSZ-74. Generally, the reaction mixture is maintained at an elevated temperature until the crystals of the SSZ-74 are formed. The water in the reaction mixture may, but does not need to be evaporated off. Crystallization is carried out in an autoclave under autogenous pressure, at a temperature below 160° C., preferably between 120° C. and 160° C., more preferably between 130° C. and 150° C. The crystallization period is typically greater than 1 day and preferably from about 3 days to about 28 days. The Si/X ratio in the reaction mixture is preferably 40 to 160, more preferably from 40 to 100, most preferably about 40.

SSZ-74 seeds may optionally be used. Seeds can sometimes reduce crystallization time and may even modify crystal size and morphology.

Crystallization may take place with or without agitation.

Once the crystals are formed, the product is separated from the reaction mixture by standard separation techniques, e.g., centrifugation or decantation. The separated material is then washed with water and optionally dried. The separated material may be vacuum dried, air dried or dried by other suitable means. Depending on the drying technique used, drying may typically take from about several minutes, e.g., 2-10 minutes, to several hours, e.g., 24-48 hours, from ambient temperature to 300° C.

The following non-limiting examples are provided to illustrate the invention. No hydrogen fluoride or other fluoride sources were used. The water evaporation step typically used in the prior art was omitted.

EXAMPLE 1

A gel was prepared by combining 21.5 mg deionized water, 141.2 mg Ludox LS-30 (30% $SiO_2$), 177.9 mg 25.8% 1,1'-(hexane-1,6-diyl)bis(1-methylpyrrolidinium), 109.3 mg 20% NaBr solution, and 50.2 mg 15% $Al(NO_3)_3$ solution in a 1.5 ml stainless steel vessel.

The starting gel had the following composition, expressed in molar ratios:

| | |
|---|---|
| Si/Al | 20 |
| OH$^-$/Si | 0.3 |
| SDA/Si | 0.225 |
| Na/Si | 0.3 |
| H$_2$O/Si | 30 |

The mixture was stirred until homogenous and then reacted under autogenous pressure at a temperature of 120° C. for 28 days in an air oven. The product was separated from the reaction mixture by centrifugation, washed with a substantial amount of deionized water and then subjected to powder X-ray diffraction (XRD). Analysis of the X-ray diffraction pattern showed the product to be pure SSZ-74 zeolite as shown in FIG. 1.

EXAMPLE 2

A gel was prepared by combining 51.7 mg deionized water, 143.4 mg Ludox LS-30 (30% SiO$_2$), 151.1 mg 25.8% 1,1'-(hexane-1,6-diyl)bis(1-methylpyrrolidinium), 138.3 mg 20% KBr solution, and 25.5 mg 15% Al(NO$_3$)$_3$ solution in a 1.5 ml stainless steel vessel.

The starting gel had the following composition, expressed in molar ratios:

| | |
|---|---|
| Si/Al | 40 |
| OH$^-$/Si | 0.3 |
| SDA/Si | 0.188 |
| K/Si | 0.3 |
| H$_2$O/Si | 30 |

The mixture was stirred until homogenous and then reacted under autogenous pressure at 160° C. for 7 days in an air oven. The product was separated from the reaction mixture by centrifugation, washed with a substantial amount of deionized water and then subjected to powder X-ray diffraction (XRD). Analysis of the X-ray difraction pattern showed the product to be pure SSZ-74 zeolite.

EXAMPLE 3

A gel was prepared by combining deionized water, 154.7 mg Ludox LS-30 (30% SiO$_2$), 130.1 mg 25.8% 1,1'-(hexane-1,6-diyl)bis(1-methylpyrrolidinium), and 24 mg 3% boric acid solution in a 1.5 ml stainless steel vessel. No alkali metal was present in the reaction mixture.

The starting gel had the following composition, expressed molar ratios:

| | |
|---|---|
| Si/B | 100 |
| OH$^-$/Si | 0.3 |
| SDA/Si | 0.15 |
| H$_2$O/Si | 30 |

The mixture was stirred until homogenous and then reacted under autogenous pressure at 160° C. for 7 days in an air oven. The product was separated from the reaction mixture by centrifugation, washed with a substantial amount of deionized water and then subjected to powder X-ray diffraction (XRD). Analysis of the X-ray diffraction pattern showed the product to be pure SSZ-74 zeolite.

EXAMPLES 4-18

A series of gels were prepared in a manner similar to Examples 1-3 above, but having the composition, expressed in molar ratios indicated below and reacted at the temperatures and times indicated.

| Example | SDA/Si | Si/B | Si/Al | OH$^-$/Si | Na/Si | K/Si | H$_2$O/Si | Time (days) | Temp ° C. |
|---|---|---|---|---|---|---|---|---|---|
| 4 | 0.188 | 0 | 40 | 0.3 | 0.15 | 0.00 | 30 | 7 | 160 |
| 5 | 0.188 | 0 | 40 | 0.3 | 0.15 | 0.00 | 30 | 28 | 160 |
| 6 | 0.188 | 0 | 40 | 0.3 | 0.15 | 0.00 | 30 | 28 | 120 |
| 7 | 0.188 | 0 | 40 | 0.3 | 0.30 | 0.00 | 30 | 28 | 120 |
| 8 | 0.238 | 0 | 40 | 0.4 | 0.30 | 0.00 | 30 | 28 | 160 |
| 9 | 0.238 | 0 | 40 | 0.4 | 0.30 | 0.00 | 30 | 28 | 120 |
| 10 | 0.188 | 0 | 40 | 0.3 | 0.00 | 0.30 | 30 | 28 | 120 |
| 11 | 0.188 | 0 | 40 | 0.3 | 0.00 | 0.00 | 30 | 7 | 160 |
| 12 | 0.188 | 0 | 40 | 0.3 | 0.00 | 0.00 | 30 | 28 | 160 |
| 13 | 0.158 | 0 | 200 | 0.3 | 0.00 | 0.00 | 30 | 7 | 160 |
| 14 | 0.158 | 0 | 200 | 0.3 | 0.00 | 0.00 | 30 | 28 | 160 |
| 15 | 0.200 | 40 | 0 | 0.6 | 0.30 | 0.00 | 30 | 4 | 160 |
| 16 | 0.150 | 100 | 0 | 0.3 | 0.00 | 0.15 | 30 | 7 | 160 |
| 17 | 0.150 | 100 | 0 | 0.3 | 0.00 | 0.15 | 30 | 28 | 160 |
| 18 | 0.150 | 100 | 0 | 0.3 | 0.00 | 0.00 | 30 | 28 | 160 |

The products were separated from their reaction mixtures by centrifugation, washed with a substantial amount of deionized water and then subjected to powder X-ray diffraction (XRD). Analysis of the X-ray diffraction patterns showed the products to be pure SSZ-74 zeolites.

EXAMPLES 19-22

The following examples demonstrate that by varying the crystallization temperature, the silica/alumina ratio and the presence of an alkali metal cation, different products are obtained.

| Examples | SDA/Si | Si/B | Si/Al | OH⁻/Si | Na/Si | K/Si | H₂O/Si | Time (days) | Temp °C. | Product |
|---|---|---|---|---|---|---|---|---|---|---|
| Comparative 19 | 0.225 | 0 | 20 | 0.3 | 0.3 | 0 | 30 | 7 | 160 | ZSM-12 |
| 19 | 0.225 | 0 | 20 | 0.3 | 0.3 | 0 | 30 | 28 | 120 | SSZ-74 |
| Comparative 20 | 0.188 | 0 | 40 | 0.3 | 0.3 | 0 | 30 | 28 | 160 | ZSM-12 |
| 20 | 0.188 | 0 | 40 | 0.3 | 0.3 | 0 | 30 | 7 | 120 | SSZ-74 |
| Comparative 21 | 0.158 | 0 | 200 | 0.3 | 0 | 0 | 30 | 2 | 200 | ZSM-12 |
| 21 | 0.158 | 0 | 200 | 0.3 | 0 | 0 | 30 | 7 | 160 | SSZ-74 |
| 21 | 0.158 | 0 | 200 | 0.3 | 0 | 0 | 30 | 28 | 160 | SSZ-74 |
| Comparative 22 | 0.15 | 100 | 0 | 0.3 | 0 | 0 | 30 | 2 | 200 | ZSM-12 |
| 22 | 0.15 | 100 | 0 | 0.3 | 0 | 0 | 30 | 7 | 160 | SSZ-74 |
| Comparative 22 | 0.15 | 100 | 0 | 0.3 | 0 | 0 | 30 | 7 | 200 | ZSM-12 |
| 22 | 0.15 | 100 | 0 | 0.3 | 0 | 0 | 30 | 28 | 160 | SSZ-74 |

To minimize impurities, it is advantageous to vary operating conditions, e.g., the Si/X ratio and the temperature. For example, as demonstrated in the aforementioned examples, it has been observed that in the absence of an alkali metal and increasing Si/X ratios, impurities are minimized at temperatures less than 200° C., preferably temperatures ranging from about 120° C. to 160° C. In the presence of an alkali metal and increasing Si/X ratio, it is advantageous to operate at temperatures less than about 160° C., preferably less than about 140° C.

It will be seen that certain changes may be made in carrying out the present invention without departing from the spirit and scope of the invention. It is intended that all matter contained in the description and shown in the figures be interpreted as illustrative and not in a limiting sense.

What is claimed is:

1. A method of preparing a synthetic crystalline material having the crystal structure of SSZ-74 comprising contacting under crystallization conditions a reaction mixture comprising at least one source of a trivalent element X, at least one source of silica, and a 1,1'-(hexane-1,6-diyl)bis(1-methylpyrrolidinium) dication as a source of structure directing agent (SDA), wherein the reaction mixture contains no source of fluoride ions, and the reaction mixture optionally contains at least one source of alkali metal cation Y.

2. The method of claim 1, wherein the trivalent element X is selected from aluminum, boron and mixtures thereof.

3. The method of claim 2, wherein X is aluminum and the source of aluminum is aluminium nitrate or hydrated alumina.

4. The method of claim 2, wherein X is boron and the source of boron is a boric acid solution.

5. The method of claim 1, wherein the source of silica is inorganic silica.

6. The method of claim 5, wherein the inorganic silica is a colloidal silica.

7. The method any one of claims 1 to 6, wherein the crystallization conditions comprise a temperature from about 120° C. to 160° C.

8. The method of claim 1, wherein the reaction mixture, has the following composition, expressed in molar ratios:

| Reactants | Molar Ratio |
|---|---|
| Si/X | 10-500 |
| H₂O/Si | 10-50 |
| OH⁻/Si | 0.10-1.0 |
| Y/Si | 0-1.0 |
| SDA/Si | 0.05-0.5 | wherein SDA is a 1,1'-(hexane-1,6-diyl)bis(1-methylpyrrolidinium) dication, X is aluminum or boron or mixtures thereof and Y is an alkali metal cation.

9. The method of claim 8, wherein the reaction mixture has a Y/Si molar ratio of 0.15-0.35.

10. The method of claim 9, wherein the reaction mixture has the following composition, expressed in molar ratios:

| Reactants | Molar Ratio |
|---|---|
| Si/X | 20-200 |
| H₂O/Si | 20-40 |
| OH⁻/Si | 0.30-0.600 |
| Y/Si | 0-0.300 |
| SDA/Si | 0.15-0.225. |

* * * * *